(12) United States Patent
Heller et al.

(10) Patent No.: US 11,573,290 B2
(45) Date of Patent: Feb. 7, 2023

(54) PHASE SHIFTER SELF-TEST

(71) Applicant: Ay Dee Kay LLC, Aliso Viejo, CA (US)

(72) Inventors: Tom Heller, Karmiel (IL); Michael Grubman, Kiryat Atta (IL); Yaniv Maroz, Kiryat-Ono (IL); Oded Katz, Ganei-Tikva (IL)

(73) Assignee: AyDee Kay LLC, Aliso Viejo, CA (US)

( * ) Notice: Subject to any disclaimer, the term of this patent is extended or adjusted under 35 U.S.C. 154(b) by 336 days.

(21) Appl. No.: 17/011,075

(22) Filed: Sep. 3, 2020

(65) Prior Publication Data
US 2022/0003839 A1  Jan. 6, 2022

Related U.S. Application Data

(60) Provisional application No. 63/047,091, filed on Jul. 1, 2020.

(51) Int. Cl.
*G01S 7/40* (2006.01)
*G01S 13/524* (2006.01)
*G01S 13/931* (2020.01)

(52) U.S. Cl.
CPC .......... *G01S 7/4008* (2013.01); *G01S 13/524* (2013.01); *G01S 13/931* (2013.01)

(58) Field of Classification Search
CPC .... G01S 7/4008; G01S 13/524; G01S 13/931; G01S 2013/0254; G01S 7/032; G01S 7/406; G01S 13/02; G01S 2013/93271; H01Q 1/3233; H01Q 3/267; H03K 5/1532; H03K 5/135; H03H 11/16; H03L 7/091; H04L 27/2067; H03C 3/40
See application file for complete search history.

(56) References Cited

U.S. PATENT DOCUMENTS

| | | |
|---|---|---|
| 3,825,737 A | 7/1974 | Croisier |
| 5,097,220 A | 3/1992 | Shimakata et al. |
| 5,732,109 A | 3/1998 | Takahashi |

(Continued)

OTHER PUBLICATIONS

Tom Heller et al., Radar Array Phase Shifter Verification, U.S. Appl. No. 16/660,370, filed Oct. 22, 2019, 28 pages.

*Primary Examiner* — Bernarr E Gregory
(74) *Attorney, Agent, or Firm* — Steven Stupp

(57) ABSTRACT

Illustrative methods and circuits to verify operation of phase shifters. One illustrative method includes: obtaining a first set of in-phase and quadrature components $(I_1,Q_1)$ of a phase shifter output signal with a first setting; measuring a second set of components $(I_2,Q_2)$ with a second setting, the second setting being offset from the first by a predetermined phase difference; and combining the first and second sets to determine whether their relationship corresponds to the predetermined phase difference. An illustrative transmitter includes: a phase shifter, an I/Q mixer, and a processing circuit. The phase shifter converts a transmit signal into an output signal having a programmable phase shift. The I/Q mixer mixes the output signal with a reference signal to obtain in-phase and quadrature components of the output signal. The processing circuit is coupled to the I/Q mixer implement the disclosed method.

23 Claims, 4 Drawing Sheets

(56) References Cited

U.S. PATENT DOCUMENTS

| | | | |
|---|---|---|---|
| 5,861,843 A * | 1/1999 | Sorace | H01Q 3/267 |
| | | | 342/174 |
| 5,994,938 A * | 11/1999 | Lesmeister | H03K 5/135 |
| | | | 327/158 |
| 6,339,399 B1 * | 1/2002 | Andersson | H01Q 3/267 |
| | | | 342/174 |
| 7,772,898 B2 * | 8/2010 | Cheung | H03L 7/091 |
| | | | 327/158 |
| 9,455,855 B1 * | 9/2016 | Feldman | H03K 5/1532 |
| 2004/0151265 A1 | 8/2004 | Fisher et al. | |
| 2004/0207478 A1 * | 10/2004 | Gumm | H03C 3/40 |
| | | | 332/103 |
| 2005/0190829 A1 * | 9/2005 | Lu | H04L 27/2067 |
| | | | 375/224 |
| 2011/0043266 A1 * | 2/2011 | Wan | H03H 11/16 |
| | | | 327/234 |

* cited by examiner

PHASE SHIFTER SELF-TEST

CROSS-REFERENCE TO RELATED APPLICATION

This application claims the benefit of U.S. Provisional Patent Application No. 63/047,091, filed on Jul. 1, 2020, the entire contents of which is incorporated herein by reference.

BACKGROUND

In the quest for ever-safer and more convenient transportation options, many car manufacturers are developing self-driving cars which require an impressive number and variety of sensors. Among the contemplated sensing technologies are multi-input, multi-output radar systems to monitor the distances between the car and any vehicles or obstacles along the travel path. Such systems may employ beam-steering techniques to improve their measurement range and resolution.

On the transmit side, beam-steering is often performed using a phased array, i.e., by supplying a transmit signal with different phase shifts to each of multiple antennas, the beam direction being determined by the differences between the phase shifts. Device mismatch, even that due to temperature and aging, may distort the beam pattern and may even cause sidelobe formation. Such effects may shift the apparent direction of obstacles or create nulls that entirely conceal obstacles from detection. Thus automotive radar safety standards, or engineering design prudence alone, may dictate that some mechanism be included to calibrate and/or verify proper operation of the phase shifters. Existing mechanisms for this purpose may unduly compromise the cost or reliability of the automotive radar systems.

SUMMARY

The problems identified above may be addressed at least in part by an improved self-tester for verifying the operation of phase shifters. One disclosed embodiment is a self-test method that includes: obtaining a first set of in-phase and quadrature components $(I_1,Q_1)$ of an output signal when the phase shifter has a first setting; measuring a second set of in-phase and quadrature components $(I_2,Q_2)$ of the output signal when the phase shifter has a second setting, the second setting being offset from the first phase setting by a predetermined phase difference; and combining the first set $(I_1,Q_1)$ with the second set $(I_2,Q_2)$ to determine whether their relationship corresponds to the predetermined phase difference.

Another disclosed embodiment is a transmitter that includes: a phase shifter, an I/Q mixer, and a processing circuit. The phase shifter converts a transmit signal into an output signal having a programmable phase shift. The I/Q mixer mixes the output signal with a reference signal to obtain in-phase and quadrature components of the output signal. The processing circuit is coupled to the I/Q mixer to obtain a first set of components $(I_1,Q_1)$ for a first value of the programmable phase shift and a second set of components $(I_2,Q_2)$ for a second value of the programmable phase shift, the first and second values providing a predetermined phase difference. The processing circuit combines the first and second sets of components to determine whether their relationship corresponds to the predetermined phase difference.

Yet another disclosed embodiment is self-test circuit that includes: an I/Q mixer, an analog-to-digital converter, one or more latches, a set of multipliers, an adder, and a comparator. The I/Q mixer determines in-phase and quadrature components of a phase shifter output signal. The analog-to-digital converter converts the analog outputs of the I/Q mixer to digital component signals. The one or more latches store a first set of components $(I_1,Q_1)$ for a first value of the programmable phase shift and a second set of components $(I_2,Q_2)$ for a second value of the programmable phase shift, the first and second values providing a predetermined phase difference that is one of −90°, +90°, or 180°. The one or more multipliers are coupled to the first and second registers to determine the products $I_1I_2$, $Q_1Q_2$, $I_1Q_2$, and $Q_1I_2$. The adder determines at least one of $(I_1I_2+Q_1Q_2)$ and $(I_1I_2-Q_1I_2)$, and the comparator that determines whether the magnitude of that sum is less than a predetermined error tolerance $\varepsilon$.

Each of the foregoing embodiments can be employed individually or in conjunction, and may include one or more of the following features in any suitable combination: 1. repeating said obtaining, measuring, and combining for each combination of phase shifter settings in which the second setting is offset from the first phase setting by the predetermined phase difference. 2. signaling a fault if the relationship between the first and second sets does not correspond to the predetermined phase difference. 3. repeating said obtaining, measuring, and combining with a different phase difference, and determining whether said relationship with the different phase difference corresponds to the predetermined phase difference instead of the different phase difference. 4. multiplying the components to obtain $I_1I_2$, $Q_1Q_2$, $I_1Q_2$, and $Q_1I_2$. 5. the predetermined phase difference is +90° or 180°, and said combining includes: calculating at least one of the following sums of products $(I_1I_2+Q_1Q_2)$ and $(I_1Q_2-Q_1I_2)$; and verifying that said at least one sum of products has a magnitude of less than a predetermined error tolerance $\varepsilon$. 6. the predetermined phase difference is −90° and it is verified that $I_1Q_2 \geq -\varepsilon$ and $Q_1I_2 \leq \varepsilon$. 7. the predetermined phase difference is +90° and it is verified that $I_1Q_2 \leq \varepsilon$ and $Q_1I_2 \geq -\varepsilon$. 8. the predetermined phase difference is 180° and it is verified that $I_1I_2 \leq \varepsilon$ and $Q_1Q_2 \leq \varepsilon$. 9. a controller that iterates through each combination of first and second values having the predetermined phase difference.

DETAILED DESCRIPTION

It should be understood that the following description and accompanying drawings are provided for explanatory purposes, not to limit the disclosure. To the contrary, they provide the foundation for one of ordinary skill in the art to understand all modifications, equivalents, and alternatives falling within the scope of the claims.

Figure 1:
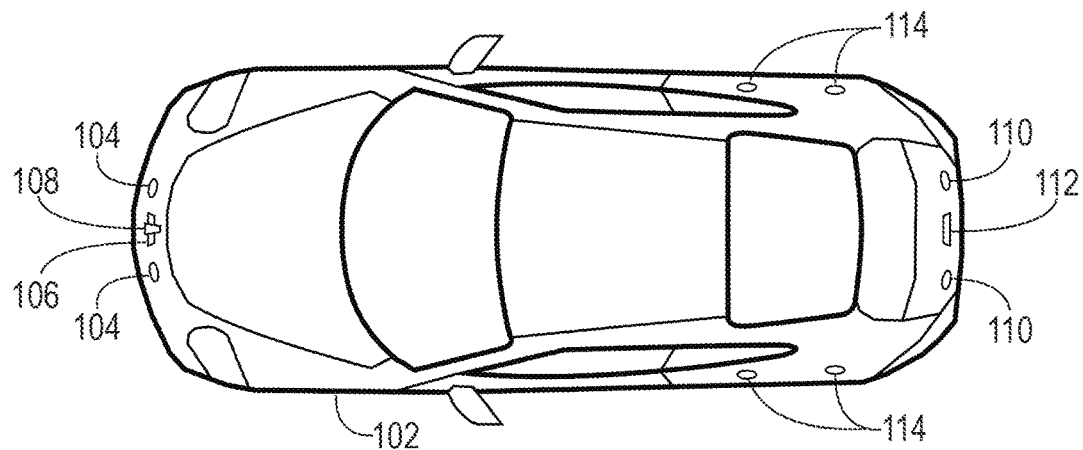
FIG. 1 is an overhead view of an illustrative vehicle equipped with sensors.

FIG. 1 shows an illustrative vehicle 102 equipped with an array of radar antennas, including antennas 104 for short range sensing (e.g., for park assist), antennas 106 for mid-range sensing (e.g., for monitoring stop & go traffic and cut-in events), antennas 108 for long range sensing (e.g., for adaptive cruise control and collision warning), each of which may be placed behind the front bumper cover. Antennas 110 for short range sensing (e.g., for back-up assist) and antennas 112 for mid range sensing (e.g., for rear collision warning) may be placed behind the back bumper cover. Antennas 114 for short range sensing (e.g., for blind spot monitoring and side obstacle detection) may be placed behind the car fenders.

Each set of antennas may perform multiple-input multiple-output (MIMO) radar sensing. The type, number, and configuration of sensors in the sensor arrangement varies for vehicles having driver-assist and self-driving features. The vehicle may employ the sensor arrangement for detecting and measuring distances/directions to objects in the various detection zones to enable the vehicle to navigate while avoiding other vehicles and obstacles.

Figure 2:
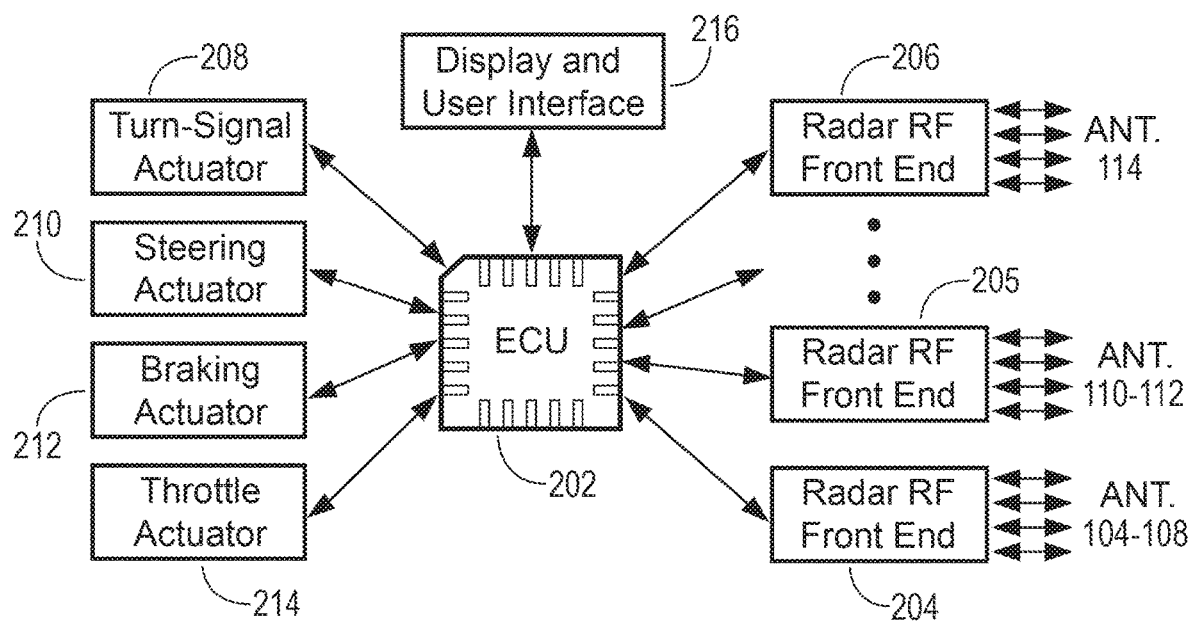
FIG. 2 is a block diagram of an illustrative driver-assistance system.

FIG. 2 shows an electronic control unit (ECU) 202 coupled to the various radar sensing front ends 204-206 as the center of a star topology. Of course, other topologies including serial, parallel, and hierarchical (tree), are also suitable and contemplated for use in accordance with the principles disclosed herein. The radar front ends each include a radio frequency (RF) transceiver which couples to some of the transmit and receive antennas 104-114 to transmit electromagnetic waves, receive reflections, and optionally to perform processing for determining a spatial relationship of the vehicle to its surroundings. (Such processing may alternatively be performed by the ECU 202.) To provide automated parking assistance or other desirable features, the ECU 202 may further connect to a set of actuators such as a turn-signal actuator 208, a steering actuator 210, a braking actuator 212, and throttle actuator 214. ECU 202 may further couple to a user-interactive interface 216 to accept user input and provide a display of the various measurements and system status, acting on the status and incoming information to actuate various signaling and control transducers as needed to provide automated parking, assisted parking, lane-change assistance, obstacle and blind-spot detection, autonomous driving, lane following, automatic braking, and other desirable features.

Radar systems operate by emitting electromagnetic waves which travel outward from the transmit antenna before being reflected back to a receive antenna. The reflector can be any moderately reflective object in the path of the emitted electromagnetic waves. By measuring the travel time of the electromagnetic waves from the transmit antenna to the reflector and back to the receive antenna, the radar system can determine the distance to the reflector. In MIMO radar sensing, multiple transmit or receive antennas are used with more sophisticated processing to enable tracking of distance and direction to multiple reflectors. At least some radar systems employ array processing to "scan" a directional beam of electromagnetic waves and construct an image of the vehicle's surroundings. Both pulsed and continuous-wave implementations of radar systems can be implemented, though frequency modulated continuous wave radar systems are generally preferred for accuracy.

Figure 3:
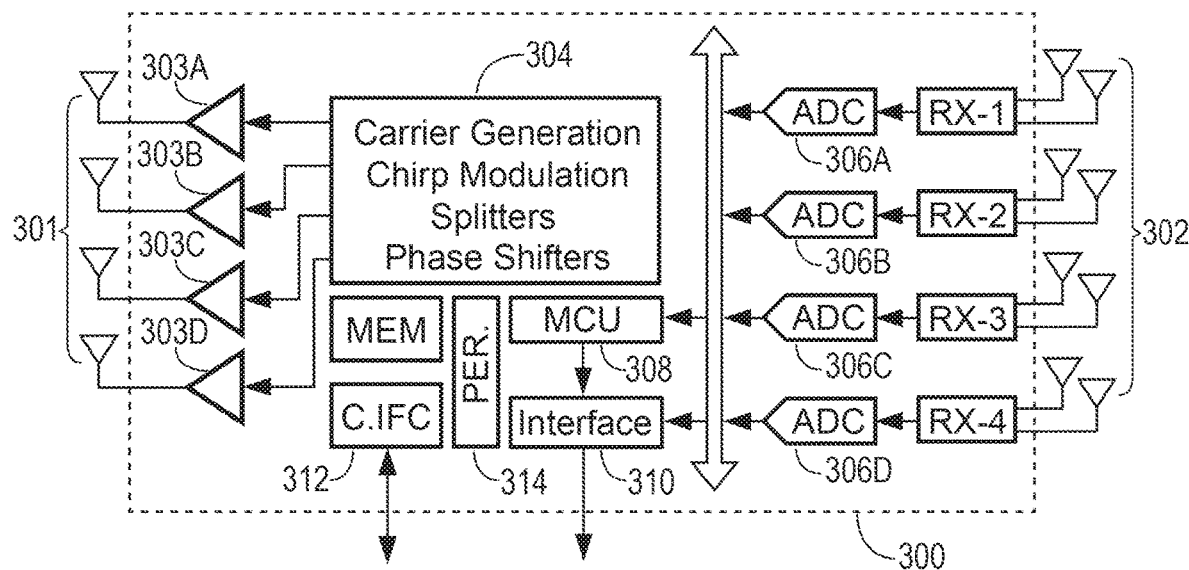
FIG. 3 is a block diagram of an illustrative radar transceiver chip.

FIG. 3 shows a block diagram of an illustrative transceiver chip 300 for a MIMO radar system. The chip 300 has antenna feeds or terminals coupled to an array of transmit antennas 301 and receive antennas 302. Power amplifiers 303A-303D drive the transmit antennas 301 with amplified signals from transmitter circuitry 304. Circuitry 304 generates a carrier signal within a programmable frequency band, using a programmable chirp rate and range. The signal generator may employ a phase-locked loop (PLL) with suitable frequency multipliers. Splitters and phase shifters derive the transmit signals for the multiple power amplifiers 303A-303D to transmit concurrently, and further provide a reference "local oscillator" signal to the receivers for use in the down-conversion process. In the illustrated example, the transceiver chip 300 includes 4 transmitters, each of which is fixedly coupled to a corresponding transmit antenna 301.

Chip 300 further includes 4 receivers (RX-1 through RX-4) each of which is selectably coupled to two of the receive antennas 302, providing a reconfigurable MIMO system with 8 receive antennas, four of which can be employed concurrently to collect measurements. Four analog to digital converters (ADCs) 306A-306D sample and digitize the down-converted receive signals from the receivers RX-1 through RX-4, supplying the digitized signals to a microcontroller unit (MCU) 308 for filtering and processing, or directly to a high-bandwidth interface 310 to enable off-chip processing of the digitized baseband signals. If used, the MCU 308 generates image data that can be conveyed to an ECU via the high-bandwidth interface 310.

A control interface 312 enables the ECU or other host processor to configure the operation of the transceiver chip 300, including the test and calibration peripheral circuits 314 and the transmit signal generation circuitry 304.

Figure 4:
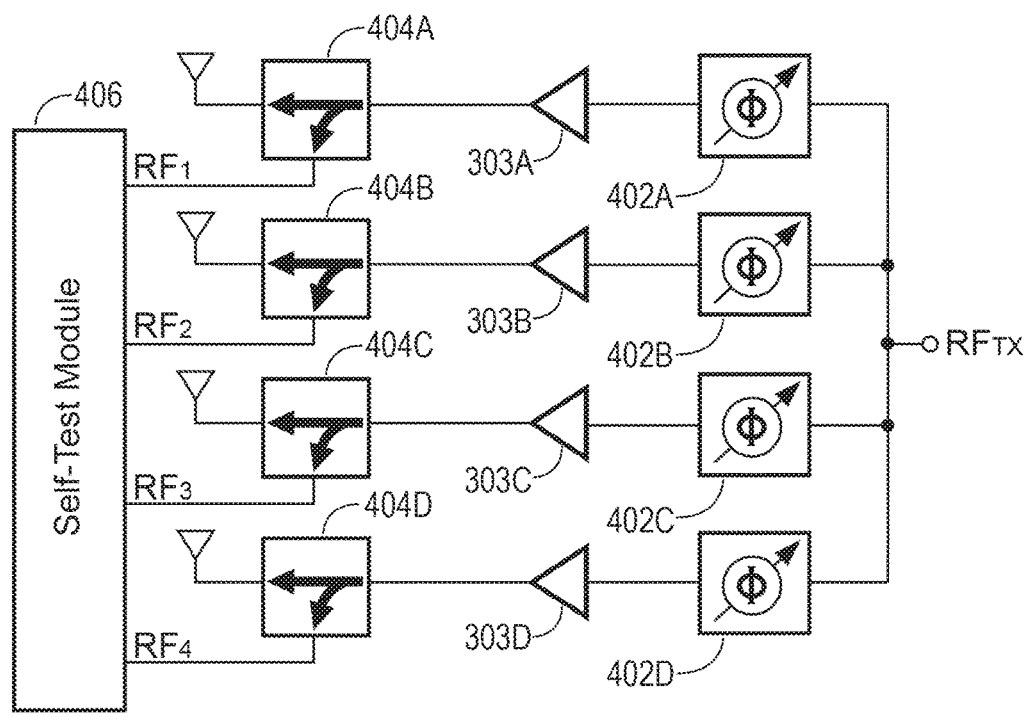
FIG. 4 is a block diagram of an illustrative phase shift transmit array.

FIG. 4 adds additional detail to illustrate the phased-array technique. A transmit signal $RF_{TX}$ (for automotive radar, the contemplated frequency range is 76 GHz-81 GHz) is supplied to four programmable phase shifters 402A-402D to provide respective phase shifts to the signals for each antenna. The power amplifiers 303A-303D amplify the phase-shifted signals to drive the transmit antennas, but just before the drive signals are output from the chips, a set of couplers 404A-404D split off a small fraction of the signal power as monitor signals that enable a self-test circuit 406 to monitor the performance of the transmit circuitry and, more particularly, the operability of the phase shifters. In a contemplated alternative embodiment, the couplers split off signal power from the phase shifter outputs, before the signals reach the power amplifiers.

Figure 5:
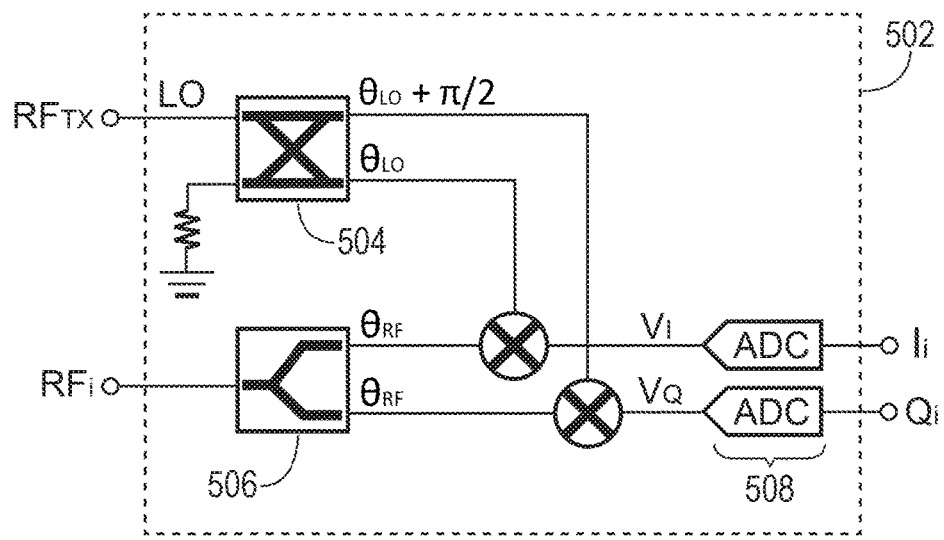
FIG. 5 is a schematic of an illustrative I/Q mixer.

FIG. 5 is a schematic of an illustrative I/Q mixer 502 that may be employed at the mm-wave frequencies contemplated herein. A quadrature coupler 504 converts a local oscillator (LO) signal (preferably the input signal to the phase shifters 402, $RF_{TX}$) into two quadrature signals (signals having the same frequency, but out of phase by 90 degrees). Quadrature couplers are known in the literature, and suitable examples include branchline couplers, Lange couplers, and overlay couplers. A splitter 506 spits an RF signal (e.g., one of the output signals $RF_i$ in FIG. 4) into two equal signals. Multipliers mix each of the quadrature LO signals with one of the RF signals to produce baseband voltages. The voltage obtained using the leading quadrature signal may be termed the in-phase voltage $V_I$, while the voltage obtained using the lagging quadrature signal may termed the quadrature-phase voltage $V_Q$. One or more analog-to-digital converters ("ADC") 508 may digitize the voltages to provide the in-phase and quadrature component values $(I_1, Q_1)$. Conventionally, the component values would be provided to a processor, ASIC, or look-up table to convert them into a detected phase $\theta_{det}$ by performing the equivalent of an arctangent operation on the ratio of $V_Q$ to $V_I$.

Figure 6:
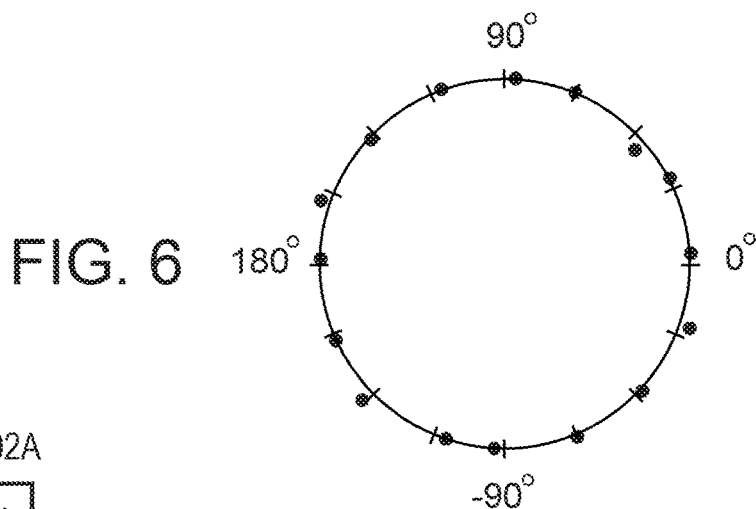
FIG. 6 is a graph of an illustrative phase shifts by a programmable phase-shifter.

The detected phase $\theta_{det}$ represents the phase difference between the LO and RF inputs, and an ideal phase shifter applying a programmable phase shift would provide (I,Q) components that are evenly spaced around a circle. FIG. 6 shows a circle with 16 evenly-spaced hash marks, along with illustrative points representing the IQ components provided by a "realistic" phase shifter. Note that some of the points do not fall precisely on the circle, indicating some amplitude variation in the output signal, and further note that most of the points are slightly offset from their ideal positions. Depending on the specified error tolerance, this phase shifter may or may not be faulty.

While the previously-mentioned division and arctangent functions may be readily implementable in silicon-based integrated circuitry with insignificant areal requirements, many integrated radar transceivers are preferably implemented using silicon-germanium (SiGe) or other such materials that support higher signal frequencies by means of faster and more robust transistors. In such materials, the areal requirements for division and arctangent functions are substantially greater and perhaps infeasible for providing low cost MIMO transceivers. Accordingly, the self-test circuitry preferably employs one of the alternative approaches set forth herein.

Figure 7:
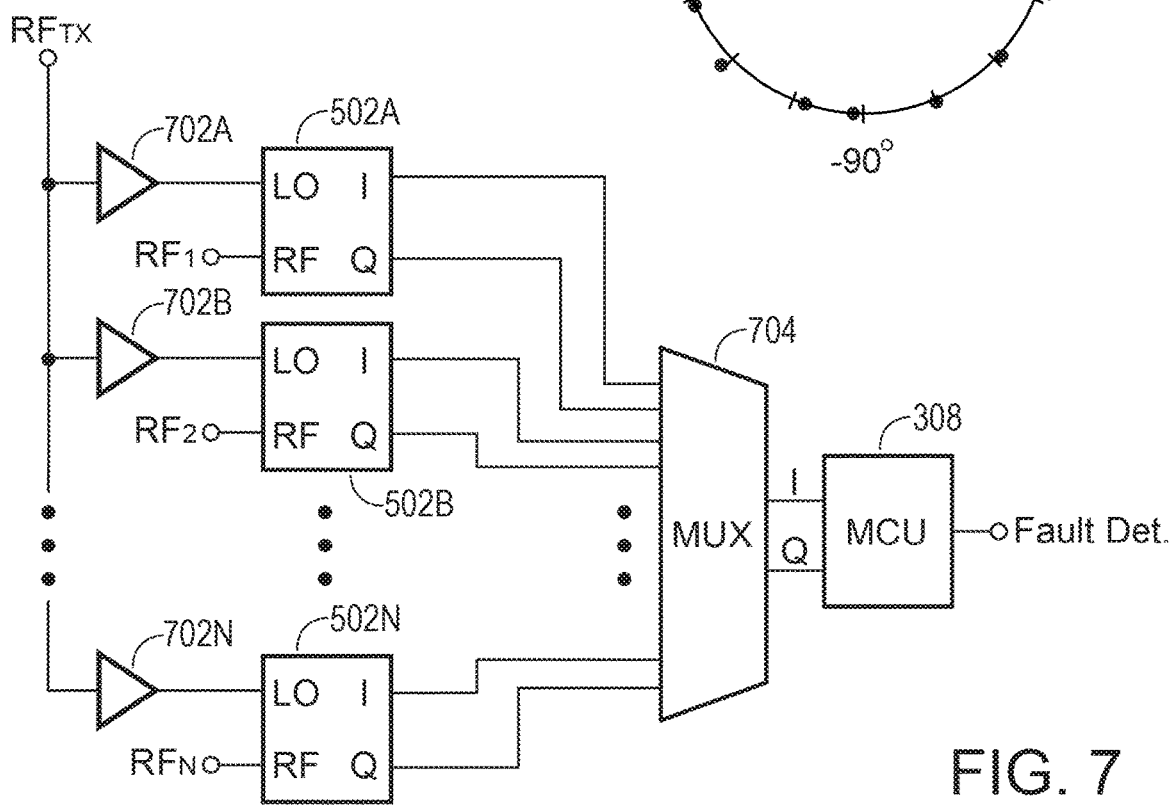
FIG. 7 is a schematic of an illustrative self-test circuit.

FIG. 7 shows an illustrative self-test circuit, in which the N output signals $RF_1$-$RF_N$ are each supplied to a respective RF input of an I/Q mixer 502A-502N, and the transmit signal $RF_{TX}$ (the input for the phase shifters in FIG. 4) is supplied (via buffers 702A-702N) to the mixers' LO input. As described in a co-owned application Ser. No. 16/660,370, filed 2019 Oct. 22 and titled "Radar Array Phase Shifter Verification" (Dkt #ONS03296B), the mixers may use other reference signals including, e.g., an adjacent one of the output signals. (In this variation, the zero degree phase difference test described below may be particularly useful to verify that adjacent phase shifters can adequately track each other as their phases are shifted in synchronization.)

A multiplexer 704 collects the sets of (I,Q) component values from the mixers 502A-502N and provides a selectable one of the sets to a processing circuit (such as a microcontroller unit 308). From each mixer, the processing circuit obtains a first set of components $(I_1,Q_1)$ when the phase shifter has a first setting and a second set of components $(I_2,Q_2)$ when the phase shifter has a second setting, which is offset from the first phase setting by a predetermined phase difference. The processing circuit may control the phase shifters to iterate through all combinations of settings having the desired phase difference. Alternatively, in designs where the phase shifters operate under control of a separate circuit, the processing circuit may monitor the phase shifter control signals and coordinate its measurements to passively verify operability of the phase shifters.

Once the sets have been obtained, the processing circuit combines the first set $(I_1,Q_1)$ with the second set $(I_2,Q_2)$ to determine whether their relationship corresponds to that expected for the predetermined phase difference. If not, the processing circuit determines the phase shifter to be faulty and signals the fault to the appropriate control circuit, e.g., by setting an error bit in the MIMO transceiver's status register. The ECU may periodically poll the sensors and alert the operator to a fault or at least to the need to have the vehicle serviced.

When the predetermined phase difference is a multiple of 90°, the relationship between the first and second sets of components is particularly amenable to verification. At zero, $I_2=I_1$ and $Q_2=Q_1$. At 180°, $I_2=-I_1$ and $Q_2=-Q_1$. At 90°, $I_2=-Q_1$ and $Q_2=I_1$. At −90°, $I_2=Q_1$ and $Q_2=-I_1$.

Unfortunately, such a direct comparison of components may sensitive to amplitude variation in the phase shifter, so the processing circuit preferably combines the sets of components. At 0°, $I_1Q_2=Q_1I_2$, $I_1I_2 \geq 0$, and $Q_1Q_2 \geq 0$. When tolerating small errors, these conditions may be more feasibly expressed as $|I_1Q_2-Q_1I_2|<\varepsilon$, $I_1I_2>-\varepsilon$, and $Q_1Q_2>-\varepsilon$, where $\varepsilon$ is the predetermined error tolerance, which is a function of the specified maximum phase error. On a unit circle, a predetermined error tolerance of $\varepsilon=0.17$ would limit the maximum phase error to less than 10°. A value of 0.05 would limit the maximum phase error to less than 3°.

At 180°, $I_1Q_2=Q_1I_2$, $I_1I_2 \leq 0$, and $Q_1Q_2 \leq 0$; or when tolerating small errors $|I_1Q_2-Q_1I_2|<\varepsilon$, $I_1I_2<\varepsilon$, and $Q_1Q_2<\varepsilon$. At 90°, $I_1I_2=-Q_1Q_2$, $I_1Q_2>0$, and $Q_1I_2 \leq 0$; or $|I_1I_2+Q_1Q_2|<\varepsilon$, $I_1Q_2>-\varepsilon$, and $Q_1I_2<\varepsilon$. At −90°, $I_1I_2=-Q_1Q_2$, $I_1Q_2 \leq 0$, and $Q_1I_2 \geq 0$; or $|I_1I_2+Q_1Q_2|<\varepsilon$, $I_1Q_2<\varepsilon$, and $Q_1I_2>-\varepsilon$. In each case, it is straightforward to verify that the sets of components satisfy the relationship expected for such phase differences. The verification can be done, e.g., in a basic arithmetic logic unit (ALU) without need for division or trigonometric functions. The ALU implements multiplication, addition, absolute value, comparison, and logic functions.

Figure 8:
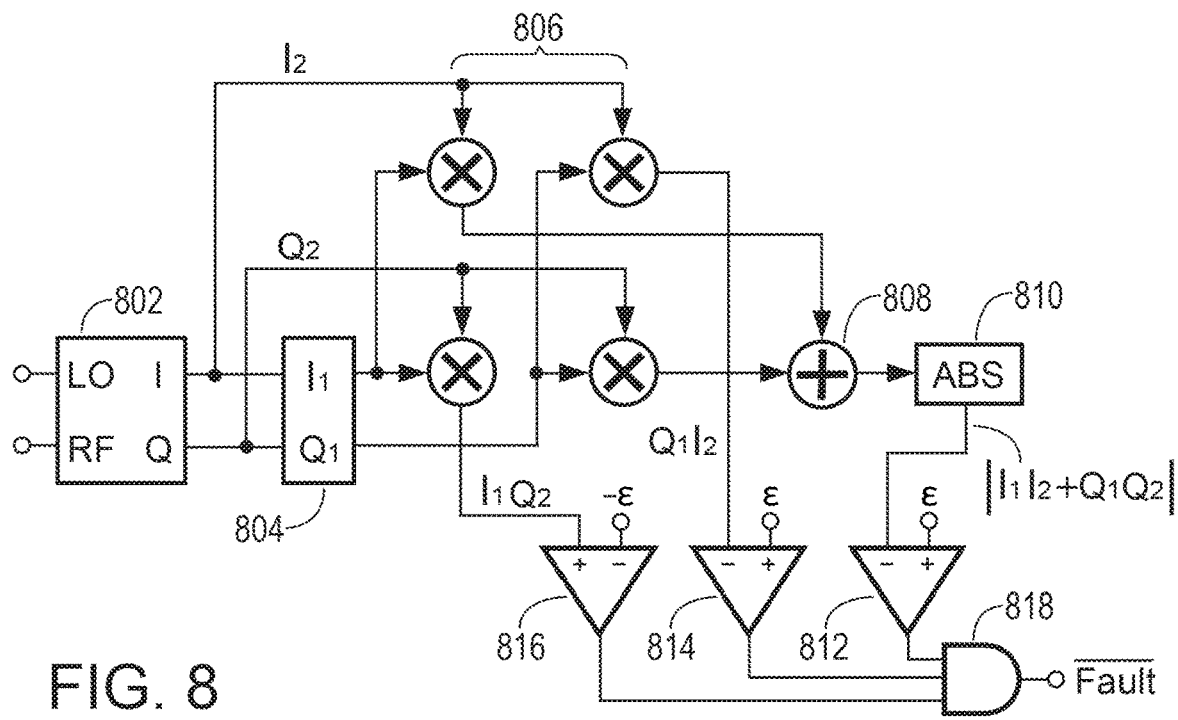
FIG. 8 is a schematic of an illustrative 90° phase shift verifier.

FIGS. 5 and 7 disclose a digital processing circuit, storing the (I,Q) components in registers or in memory, employing firmware to configure an ALU for the desired operations. However, we note here that the processing circuit can also be implemented in analog fashion, e.g., using Vi and Vq as the (I,Q) components. FIG. 8 discloses such a circuit as part of the self-test unit for verifying a 90° phase offset between phase shifter settings. An I/Q mixer combines the input and output of the phase shifter to be tested, producing the (I,Q) components in analog form. A sample and hold circuit 804 captures the first set of components $(I_1,Q_1)$ and holds their values while a subsequent set of components $(I_2,Q_2)$ is measured. A set of multipliers 806 determines the products $I_1I_2$, $Q_1Q_2$, $I_1Q_2$, and $Q_1I_2$. An adder 808 and absolute value circuit 810 combine the first two of these to determine $I_1I_2+Q_1Q_2$, and comparator 812 asserts its output if this quantity is less than the predetermined error tolerance $\varepsilon$. A second comparator 814 asserts its output is $Q_1I_2<\varepsilon$, and a third comparator 816 asserts its output if $I_1Q_2>-\varepsilon$. A logical AND gate 818 combines the comparator outputs, asserting its output when the tests confirm that the two sets of components indicate a 90° phase difference. If any of the comparisons fail, the output of gate 818 is low, indicating a fault in the phase shifter.

Figure 9:
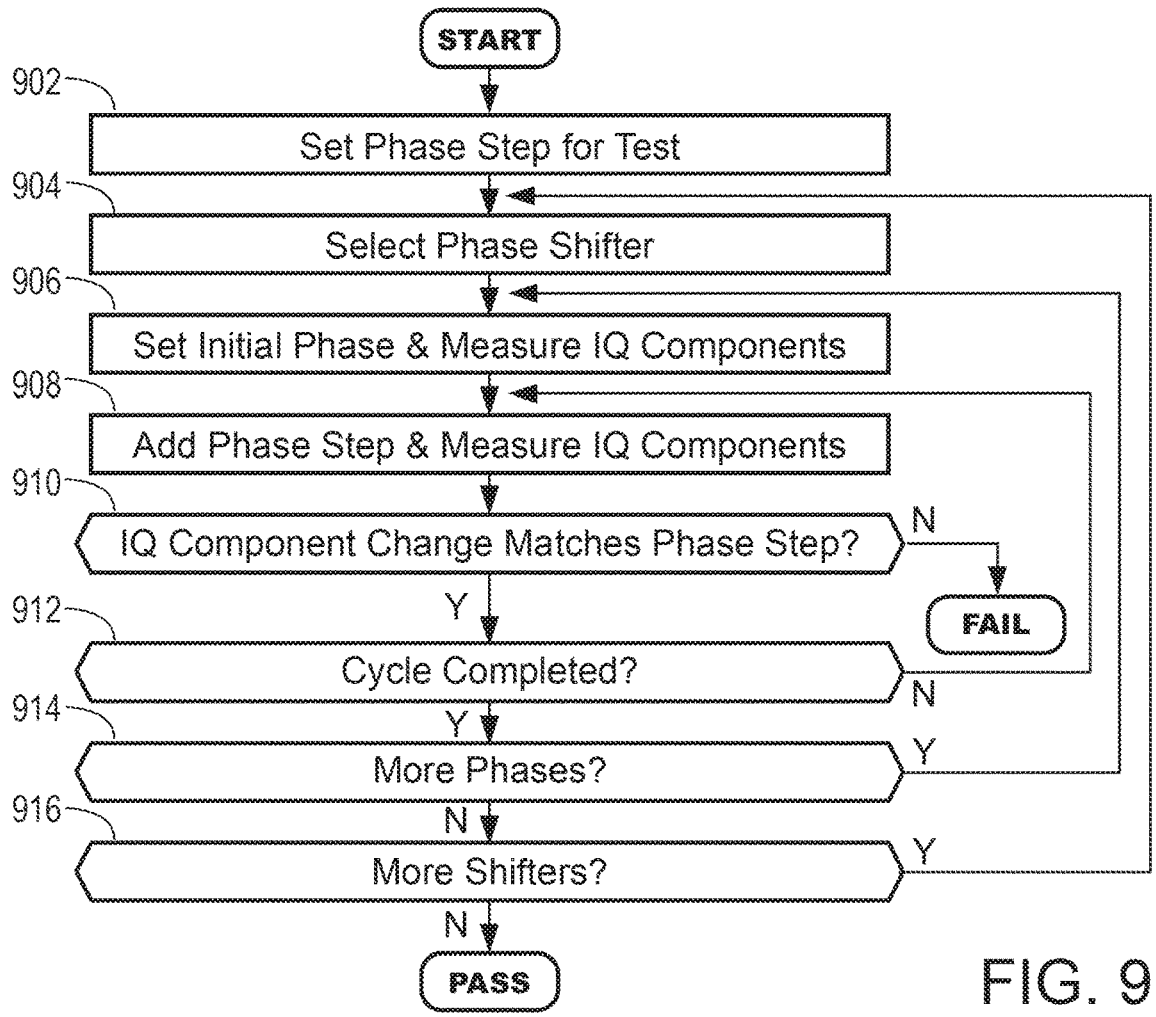
FIG. 9 is a flow diagram of an illustrative self-test method.

In light of the foregoing disclosure, FIG. 9 discloses an illustrative method for verifying the operation of phase shifters in, e.g., a multi-output radar transmitter. The method may be implemented by a controller such as microcontroller unit 308.

In block 902, a predetermined phase difference is selected, such as ±90°. In block 904, the controller begins a loop to iterate through each of the phase shifters to be tested, selecting an initial one and, in subsequent iterations of the loop, selecting the next.

In block 906, the controller begins an inner loop to iterate through each starting point for a cycle. With a chosen phase difference of ±90°, each cycle tests four phase settings. For a phase shifter with, say, 32 possible phase shifts, there will be eight cycles, each with a different starting point. The controller sets the initial phase shift for the cycle and measures the first set of (I,Q) components.

in block 908, the controller begins an innermost loop to iterate through the phase settings for the current cycle. The controller adjusts the phase shifter setting to provide the selected phase difference relative to the previous measurement, and measures the next set of (I,Q) components.

In block 910, the controller combines the current and previous sets of (I,Q) components to determine whether their relationship corresponds to the selected phase difference. If not, the controller signals that the phase shifter is faulty, terminating the process. Otherwise, in block 912, the controller determines whether each of the phase settings for the current cycle have been tested, returning to block 908 if not.

In block 914, the controller determines whether all of the cycles for the current phase shifter have been completed, returning to block 906 if not. In block 916, the controller determines whether all of the phase shifters have been tested, returning to block 904 if not.

Note that if it is desired to verify the self-test method itself, the controller may execute the method with a different phase difference selected in block 902, but maintaining the original relationship test in block 910, creating a condition that should cause the method to indicate the presence of a fault. If no such fault is detected, the self-test method is faulty.

Numerous other modifications, equivalents, and alternatives, will become apparent to those of ordinary skill in the art once the above disclosure is fully appreciated. For example, the illustrative method of FIG. 9 is shown and described as a serial process, but those skilled in the art will recognize that many of its operations can be pipelined or otherwise performed in parallel, potentially with out-of-order operations and speculative execution, where it is deemed desirable to trade off hardware complexity for faster execution. As another example, FIG. 5 shows two mixers: one for detection of the I component and another mixer for the detection of the Q component, but could instead be designed to use a single mixer and a switch that selects one of the quadrature coupler outputs for use by the single mixer. So long as the RF signal and the LO reference signal remain unchanged with respect to each other during the test, both I and Q components can be measured, thereby avoiding amplitude offsets attributable to device mismatch. It is intended that the following claims be interpreted to embrace all such modifications, equivalents, and alternatives where applicable.

What is claimed is:

1. A self-test method for a phase shifter, the method comprising:
   obtaining a first set of in-phase and quadrature components ($I_1,Q_1$) of an output signal when the phase shifter has a first setting;
   measuring a second set of in-phase and quadrature components ($I_2,Q_2$) of the output signal when the phase shifter has a second setting, the second setting being offset from the first phase setting by a predetermined phase difference; and
   combining the first set ($I_1,Q_1$) with the second set ($I_2,Q_2$) to determine whether their relationship corresponds to the predetermined phase difference.

2. The method of claim 1, further comprising:
   repeating said obtaining, measuring, and combining for each combination of phase shifter settings in which the second setting is offset from the first phase setting by the predetermined phase difference.

3. The method of claim 1, further comprising: signaling a fault if the relationship between the first and second sets does not correspond to the predetermined phase difference.

4. The method of claim 1, further comprising:
   checking the self-test method by repeating said obtaining, measuring, and combining with a different phase difference; and
   determining whether said relationship with the different phase difference corresponds to the predetermined phase difference instead of the different phase difference.

5. The method of claim 1, wherein said combining includes multiplying the components to obtain $I_1I_2$, $Q_1Q_2$, $I_1Q_2$, and $Q_1I_2$.

6. The method of claim 1, wherein the predetermined phase difference is 0, ±90° or 180°, and said combining includes:
   calculating at least one of the following sums of products ($I_1I_2+Q_1Q_2$) and ($I_1Q_2-Q_1I_2$); and
   verifying that said at least one sum of products has a magnitude of less than a predetermined error tolerance ε.

7. The method of claim 6, wherein the predetermined phase difference is −90° and the method further comprises verifying that $I_1Q_2 \geq -\varepsilon$ and $Q_1I_2 \leq \varepsilon$.

8. The method of claim 6, wherein the predetermined phase difference is +90° and the method further comprises verifying that $I_1Q_2 \leq \varepsilon$ and $Q_1I_2 \geq -\varepsilon$.

9. The method of claim 6, wherein the predetermined phase difference is 0° and the method further comprises verifying that $I_1I_2 \geq \varepsilon$ and $Q_1Q_2 \geq \varepsilon$.

10. The method of claim 6, wherein the predetermined phase difference is 180° and the method further comprises verifying that $I_1I_2 \leq \varepsilon$ and $Q_1Q_2 \leq \varepsilon$.

11. A transmitter that comprises:
    a phase shifter that converts a transmit signal into an output signal having a programmable phase shift;
    a I/Q mixer that mixes the output signal with a reference signal to obtain in-phase and quadrature components of the output signal; and
    a processing circuit coupled to the I/Q mixer to obtain a first set of components ($I_1,Q_1$) for a first value of the programmable phase shift and a second set of components ($I_2,Q_2$) for a second value of the programmable phase shift, the first and second values providing a predetermined phase difference, the processing circuit combining the first and second sets of components to determine whether their relationship corresponds to the predetermined phase difference.

12. The transmitter of claim 11, wherein as part of said combining, the processing circuit multiplies the components to obtain $I_1I_2$, $Q_1Q_2$, $I_1Q_2$, and $Q_1I_2$.

13. The transmitter of claim 11:
    wherein the predetermined phase difference is −90°, 0, +90°, or 180°, and
    wherein as part of said combining, the processing circuit verifies that at least one of ($I_1I_2+Q_1Q_2$) and ($I_1Q_2-Q_1I_2$) has a magnitude less than a predetermined error tolerance E.

14. The transmitter of claim 13, wherein the predetermined phase difference is −90° and the processing circuit verifies that $I_1Q_2 \geq -\varepsilon$ and $Q_1I_2 \leq \varepsilon$.

15. The transmitter of claim 13, wherein the predetermined phase difference is +90° and the processing circuit verifies that $I_1Q_2 \leq \varepsilon$ and $Q_1I_2 \geq -\varepsilon$.

16. The transmitter of claim 13, wherein the predetermined phase difference is 0° and the processing circuit verifies that $I_1I_2 \geq \varepsilon$ and $Q_1Q_2 \geq \varepsilon$.

17. The transmitter of claim 13, wherein the predetermined phase difference is 180° and the processing circuit verifies that $I_1I_2 \leq \varepsilon$ and $Q_1Q_2 \leq \varepsilon$.

18. A self-test circuit for a phase shifter having a programmable phase shift, the circuit comprising:
- an I/Q mixer that determines in-phase and quadrature components of an output signal from the phase shifter;
- a first latch that stores a first set of components $(I_1, Q_1)$ for a first value of the programmable phase shift;
- a second latch that stores a second set of components $(I_2, Q_2)$ for a second value of the programmable phase shift, the first and second values providing a predetermined phase difference that is one of −90°, 0, +90°, or 180°;
- one or more multipliers coupled to the first and second registers to determine the products $I_1I_2$, $Q_1Q_2$, $I_1Q_2$, and $Q_1I_2$;
- an adder that determines at least one of the sums $(I_1I_2 + Q_1Q_2)$ and $(I_1Q_2 − Q_1I_2)$; and
- a comparator that determines whether the magnitude of said at least one of the sums is less than a predetermined error tolerance E.

19. The self-test circuit of claim 18, wherein the predetermined phase difference is −90° and the circuit verifies that $I_1Q_2 \geq -\varepsilon$ and $Q_1I_2 \leq \varepsilon$.

20. The self-test circuit of claim 18, wherein the predetermined phase difference is +90° and the circuit verifies that $I_1Q_2 \leq \varepsilon$ and $Q_1I_2 \geq -\varepsilon$.

21. The self-test circuit of claim 18, wherein the predetermined phase difference is 0° and the circuit verifies that $I_1I_2 \geq \varepsilon$ and $Q_1Q_2 \geq \varepsilon$.

22. The self-test circuit of claim 18, wherein the predetermined phase difference is 180° and the circuit verifies that $I_1I_2 \leq \varepsilon$ and $Q_1Q_2 \leq \varepsilon$.

23. The self-test circuit of claim 18, further comprising a controller that iterates through each combination of first and second values having the predetermined phase difference.

* * * * *